United States Patent
Prevond et al.

(10) Patent No.: US 9,371,575 B2
(45) Date of Patent: *Jun. 21, 2016

(54) METHOD FOR MANUFACTURING A METAL ASSEMBLY

(75) Inventors: Laurent Prevond, Villeparisis (FR); Nicolas Collard, Rethel (FR); Renaud Caplain, Paris (FR); Pierre Francois, Montrouge (FR)

(73) Assignees: Centre National de la Recherche Scientifique (CNRS) (FR); CNAM—Conservatoire National des Arts Et Metiers (FR); Ecole Normale Superieure de Cachan (FR)

(*) Notice: Subject to any disclaimer, the term of this patent is extended or adjusted under 35 U.S.C. 154(b) by 425 days.

This patent is subject to a terminal disclaimer.

(21) Appl. No.: 13/634,303

(22) PCT Filed: Mar. 11, 2011

(86) PCT No.: PCT/EP2011/053748
§ 371 (c)(1),
(2), (4) Date: Sep. 12, 2012

(87) PCT Pub. No.: WO2011/110686
PCT Pub. Date: Sep. 15, 2011

(65) Prior Publication Data
US 2013/0022834 A1    Jan. 24, 2013

(30) Foreign Application Priority Data
Mar. 12, 2010   (FR) .................................... 10 51808

(51) Int. Cl.
*B32B 5/18*       (2006.01)
*C23C 8/80*       (2006.01)
(Continued)

(52) U.S. Cl.
CPC . *C23C 8/80* (2013.01); *B21D 47/04* (2013.01); *B22F 7/04* (2013.01); *B23K 31/02* (2013.01); *B32B 3/266* (2013.01); *B32B 3/28* (2013.01); *B32B 5/18* (2013.01); *B32B 15/012* (2013.01);
(Continued)

(58) Field of Classification Search
None
See application file for complete search history.

(56) References Cited

U.S. PATENT DOCUMENTS 3,873,392 A * 3/1975 Niebylski et al. ............. 428/141
6,085,965 A * 7/2000 Schwartz et al. ............. 228/190
(Continued)

FOREIGN PATENT DOCUMENTS

EP   1061596 A2   12/2000
EP   1468765 A1   10/2004
(Continued)

OTHER PUBLICATIONS
Translation of JP 03-215027. Sep. 1991.*
(Continued)

*Primary Examiner* — Daniel J Schleis
(74) *Attorney, Agent, or Firm* — Lerner, David, Littenberg, Krumholz & Mentlik, LLP

(57) ABSTRACT

The invention relates to a method for manufacturing an aluminum/metal assembly consisting of a metal layer made of a first metal on the surface of a metal object made of a second metal, the first or second metal being aluminum, wherein said method includes the following steps: placing a metal foam having an open porosity on a surface of the metal object, and applying mechanical stress to the metal foam in such a manner that said foam becomes embedded in the surface of the object.

18 Claims, 2 Drawing Sheets

(51) Int. Cl.
*B21D 47/04* (2006.01)
*B22F 7/04* (2006.01)
*B32B 3/26* (2006.01)
*B32B 3/28* (2006.01)
*B32B 15/01* (2006.01)
*B32B 15/20* (2006.01)
*C22F 1/00* (2006.01)
*C22F 1/04* (2006.01)
*F28F 21/08* (2006.01)
*B23K 31/02* (2006.01)
*B32B 15/04* (2006.01)
*B22F 7/00* (2006.01)
*C22C 47/20* (2006.01)

(52) U.S. Cl.
CPC ............ *B32B 15/016* (2013.01); *B32B 15/017* (2013.01); *B32B 15/04* (2013.01); *B32B 15/20* (2013.01); *C22F 1/00* (2013.01); *C22F 1/04* (2013.01); *F28F 21/084* (2013.01); *B22F 7/004* (2013.01); *B22F 2999/00* (2013.01); *B32B 2457/18* (2013.01); *C22C 47/20* (2013.01); *F28F 2275/06* (2013.01); *Y10T 428/12479* (2015.01)

(56) References Cited

U.S. PATENT DOCUMENTS

| | | |
|---|---|---|
| 2005/0208263 A1 | 9/2005 | Wilkens et al. |
| 2008/0241582 A1 | 10/2008 | Groll |
| 2009/0166067 A1 | 7/2009 | Iwai et al. |
| 2013/0048154 A1* | 2/2013 | Prevond et al. ............... 148/531 |
| 2013/0061987 A1* | 3/2013 | Prevond et al. ............... 148/285 |

FOREIGN PATENT DOCUMENTS

| | | | |
|---|---|---|---|
| FR | 2683173 | * | 5/1993 |
| JP | 55-32346 | * | 3/1980 |
| JP | 2011320 A | | 1/1990 |
| JP | 3215027 A | | 9/1991 |
| JP | 5307913 A | | 11/1993 |
| JP | 7262827 A | | 10/1995 |
| JP | 8-257768 | * | 10/1996 |
| JP | 2001297780 A | | 10/2001 |
| WO | WO 02/16064 | * | 2/2002 |

OTHER PUBLICATIONS

International Search Report for Application No. PCT/EP2011/053748 dated May 9, 2011.

French Preliminary Search Report for Application No. FR1051808 dated Oct. 14, 2010.

Database WPI, Week 200228, Thomson Scientific, London, GB; AN 2002-220834, XP002634278.

Database WPI, Week 199144, Thomson Scientific, London, GB; AN 1991-321345, XP002634277.

\* cited by examiner

METHOD FOR MANUFACTURING A METAL ASSEMBLY

CROSS REFERENCE TO RELATED APPLICATIONS

The present application is a national phase entry under 35 U.S.C. §371 of International Application No. PCT/EP2011/053748, filed on Mar. 11, 2011, which claims priority from French Patent Application No. 1051808, filed Mar. 12, 2010, the disclosures of which are incorporated by reference herein.

FIELD OF THE INVENTION

The invention generally relates to the manufacture of aluminium-metal assemblies.

More precisely, the invention relates to the manufacture of an ensemble comprising an aluminium object and a metal coating assembled to produce a metal assembly having strong cohesion.

BACKGROUND OF THE INVENTION

Aluminium is a malleable metal, paramagnetic, of low density, highly conductive and has excellent resistance properties to oxidation.

In fact, during its oxidation with air it forms very rapidly on the surface a layer fine of alumina which protects it from the progression of oxidation. This natural layer of alumina has a thickness generally ranging from one to five micrometers.

However, alumina is highly insulating, as opposed to aluminium, and forms a barrier especially preventing the aluminium from attaching to another metal (for example on iron, steel or copper).

Some applications however require materials having at the same time properties of the aluminium, especially its conductivity, its low density, etc. but also additional properties such as magnetism, resistance to breaking, welding capacity, rigidity, or even better conductivity that steel, nickel or copper especially can present.

The manufacture of an aluminium-based alloy is often highly problematical. Typically, equilibrium diagrams show that aluminium-based alloys with ferromagnetic materials are possible, but they are likely to form a limited number of compounds only, mechanically fragile and paramagnetic.

The manufacture and forming of metal assemblies comprising an object made of aluminium and a coating in another metal, especially nickel, copper, iron, cobalt, etc. also interests manufacturers. In fact, making light and rigid metal assemblies currently requires assembly by welding, adhesion, etc. which cannot easily be done with all types of metals, aluminium in particular, which generally have limited cohesion.

For example, in the field of electrical conductors, the aim is to produce conductors having excellent conductivity, which are robust and durable and resist mechanical stresses to which they can be subjected during installation, but also be light and low-cost.

Copper, which is the metal most commonly used for electric wires, has excellent thermal and electric conductivity and produces robust and durable conductors. But these conductors are dense and cannot be used in all areas, in particular in aeronautics or in space research.

Aluminium however, due to its low density, is particularly adapted in those areas where the mass of the conductor constitutes technical stress. Typically, it is often used in the transport of high-power electricity. Nevertheless, aluminium is less conductive than copper and more malleable such that it breaks more easily and therefore cannot be used in any type of electrical installation. In addition, connections made of aluminium prove difficult, both because of the layer of alumina which forms on the surface of the aluminium and which, as has been seen, prevents any welding and is not conductive. It is therefore often necessary to use specific connection means.

The aim has been therefore to obtain metal assemblies constituted at the same time by aluminium and another metal such as copper, to combine the advantageous properties of these materials. Previously known processes are difficult to implement and are relatively costly.

Typically, chemical or electrolytic deposits of metals on aluminium have a very low yield because of the presence of the layer of alumina.

Another known process consists of projecting the metals by plasma, such as copper, onto the aluminium object. This process is however difficult to implement and is costly.

An aim of the invention is therefore to propose a manufacturing process of an aluminium-metal assembly which is reproducible, low-cost, which involves low energy expenditure and which produces an assembly at the same time exhibiting properties of aluminium and that of another metal.

For this, the invention proposes a manufacturing process of an aluminium-metal metal assembly, comprising a metal layer made of a first metal at the surface of a metal object made of a second metal, the first or the second metal being aluminium, characterised in that it comprises the following steps:
  placing a metal foam having an open porosity onto a surface of the metal object, and
  applying mechanical stress to the metal foam so as to embed it in the surface of the object.

Some preferred though non-limiting aspects of the process according to the invention are the following:
  the first metal is selected from the following group: copper, nickel, iron, aluminium,
  the object is a wire, a cable, a bar, a foil, a sheet metal,
  the metal object is a foil or sheet of aluminium, and the mechanical stress is applied to the metal assembly by rolling, press-forming, embossing, forging, or stamping of the metal object with the metal foam,
  rolling is done cold,
  the object is a wire or a cable and the mechanical stress is applied by crimping or rolling in a segment of the metal layer on the object,
  crimping is done by means of a pod whereof an internal surface is covered by the metal foam,
  the metal foam is embedded over the entire surface of the metal object,
  it further comprises a densification step of the metal layer during which an additional metal layer made of a third material is applied to the metal layer of the assembly,
  the additional metal layer is applied by chemical or electrolytic deposit,
  the additional metal layer is an additional metal foam which is embedded in the surface of the metal layer of the metal assembly by repeating the steps for placement and application of stress of the process, and
  the second metal is aluminium, and the process further comprises the following steps prior to the placement step of the foam on the object:
  thermally processing the aluminium object by bringing it to a temperature between 80% and 100% of the fusion temperature of the material constituting it to create and stabilise a layer of alumina alpha by allotropic transformation of the layer of oxide present on the surface of said aluminium object, and cooling the aluminium object.

According to a second aspect, the invention relates to a metal assembly obtained by the manufacturing process according to the invention, comprising a metal layer embedded in a surface of a metal object following an application step of mechanical stress.

Some preferred though non-limiting aspects of the metal assembly according to the invention are the following:

the first and the second metal are selected respectively from the following couples of metals:

copper, aluminium,
aluminium, copper,
nickel, aluminium,
aluminium, nickel,
iron, aluminium, and
aluminium, aluminium, it further comprises an additional metal layer made of a third metal, the additional metal layer is embedded in the metal layer made of the first material, the metal object is an aluminium wire or a cable and the metal layer is copper, and the metal object is sheet metal or an aluminium foil and the metal layer is copper or nickel.

Other characteristics, aims and advantages of the present invention will emerge more clearly from the following detailed description, and with respect to the attached drawings given by way of non-limiting examples.

DETAILED DESCRIPTION

Figure 1:
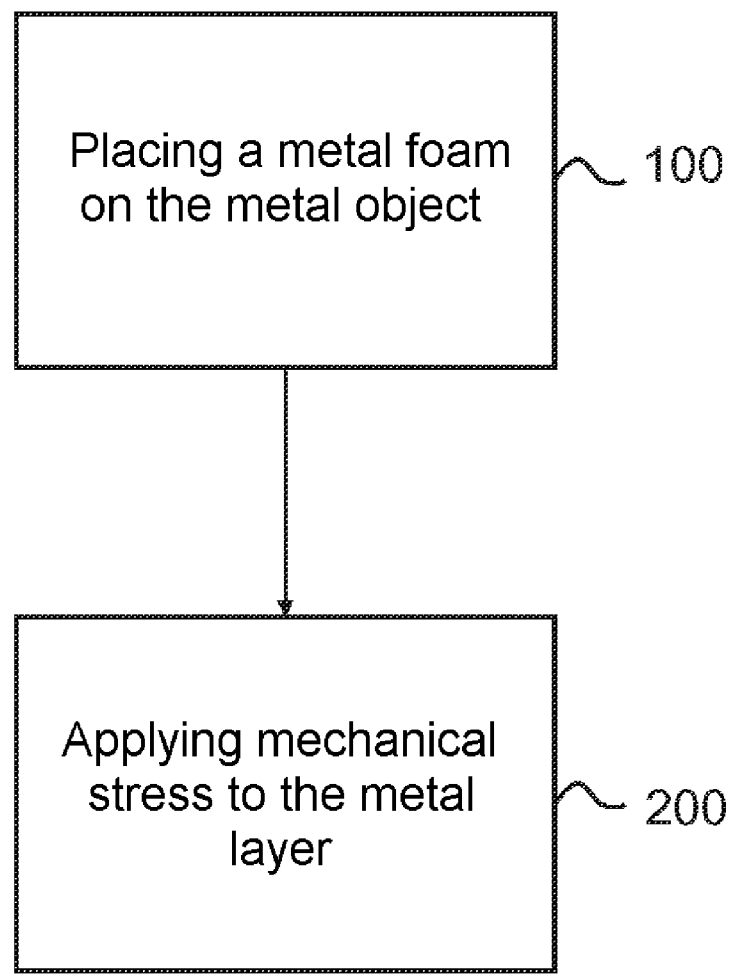
FIG. 1 is a graphic representation of an embodiment of the process according to the invention.
Figure 2:
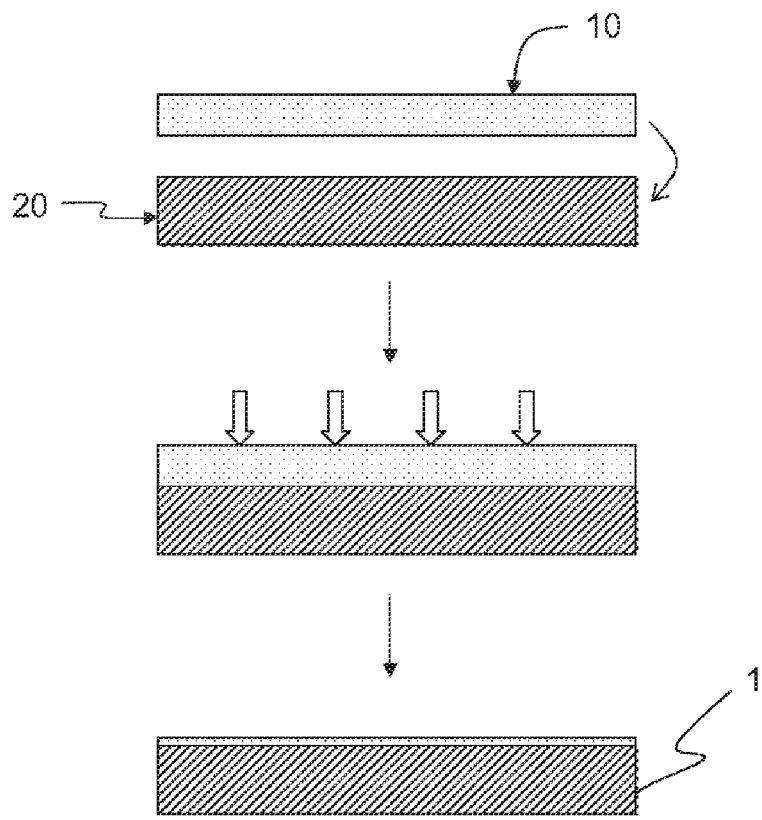
FIG. 2 represents an example of a first metal assembly viewed in section during the different steps of the process according to the invention.
Figure 3:
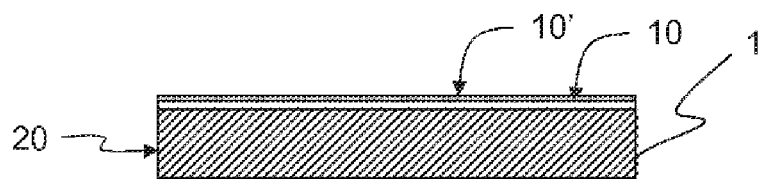
FIG. 3 is a view in section of an example of a second metal assembly according to the invention.

A manufacturing process of a metal assembly 1 will be described first, comprising a metal layer made of a first metal on the surface of a metal object 10 made of a second metal, at least one of the first and second metals being aluminium.

Aluminium can be pure aluminium (for example of type A9) or alloyed. It can especially be aluminium belonging to the series 1000 of international nomenclature (A5 to A9, ... ) or AU4G (French nomenclature).

The other metal can as such be a pure or alloyed metal. In the following, those embodiments in which the metal is copper, nickel, iron or aluminium will be described more particularly. Yet this is not limiting, as other metals can be used since they present ductility which is lower or equal to that of aluminium.

Finally, the form and dimensions of the object 10 selected to carry out the process according to the invention are limited only by the steps of the process itself and the tools used. A number of examples will be given hereinbelow.

According to a first step 100, a metal layer made of the first material is deposited onto a surface of the metal object 10.

In keeping with the invention, the metal layer is a metal foam 20 having an open porosity. Typically, the pores of the metal foam 20 are less than 1 millimeter to allow embedding of the foam in the metal object. In fact, when the diameter of the pores is too large, the metal foam 20 is no longer rigid enough to hang onto the metal object.

In a second step 200, mechanical stress is applied to the metal foam 20 so as to embed it in the surface of the object 10.

The mechanical stress can be delivered especially by crimping, rolling, press-forming (or any other technique such as embossing, forging or stamping) according to the initial form of the object 10.

Typically, if the object 10 is relatively plane, such as sheet metal, a metal foil, a metal grille, an array, etc. and has dimensions for moving the object 10 and the foam 20 into a rolling mill, the mechanical stress can be created by rolling of the metal object 10 with the metal foam.

For example, for a sheet of aluminium 10 of 0.8 mm in thickness and a metal foam 20 of 2 mm in thickness, the mechanical stress is created by rolling in a conventional rolling mill. The resulting metal assembly 1 comprises a layer of copper 20 embedded in the sheet of aluminium 10, whereof the overall thickness is of the order of 0.7 mm, the two metals having excellent cohesion and unable to be separated mechanically.

A similar result is obtained for example by rolling of a sheet of aluminium 10 with a foam 20 of nickel, of iron or aluminium, or even by rolling of sheet metal 10 of copper, of nickel, etc. with aluminium foam 20.

Rolling of the object 10 with the metal foam 20 can be done hot or cold, in one or more passes. However, the inventors have noticed that cold rolling (i.e. at ambient temperature, without heat, for example between around 0° C. and 60° C.) in a single pass produced much better results.

In fact, when rolling is done hot, the metal foam 20 risks being oxidised, hampering assembly, in particular when the latter is copper.

Rolling can however be done in several passes: but this increases the overall cost of the manufacturing process and its duration, without as such improving cohesion between the metal object 10 and the metal layer of the assembly 1.

Rolling can especially be done at a speed between 0.1 km/h and 3 km/h, by applying a few tonnes of pressure, typically of the order of three to four tonnes.

Prior to rolling, it is possible to assemble the metal object 10 and the metal foam 20 to prevent the metal assembly 1 from deforming or shifting during rolling, for example by riveting the object 10 and the foam, spot-welding when possible, prerolling of the head of the assembly, auto-perforating screws, electron-beam welding, or any conventional adhesion or flanging system.

In the example described above, the result is a sheet of aluminium 10 on which is printed a fine layer of copper 20. This metal assembly 1 at the same time has:

the properties of aluminium, and more particularly its density, its malleability, as well as its paramagnetic and conductive characters, without as such presenting, on the printed face, the drawbacks of aluminium linked to the surface presence of the layer of oxide, and the properties of copper, in this case specifically its electric and thermal conductibility, its resistance to corrosion, etc.

The metal assembly 1 is therefore weldable on the layer of copper, especially by tin, and can be assembled by classic means, without additional thermal, chemical or mechanical treatment, since the layer of alumina of the sheet of aluminium 10 is presently covered by the layer of copper 20.

This process also produces large aluminium surfaces covered by a layer of copper, and can be used as electrodes for fuel cells. Advantageously, the manufacture of such electrodes according to the process of the invention can easily be industrialised on a large scale at very low energy costs and expenses.

The process also easily makes sacrificial anodes, by printing a foam 20 of copper, of nickel, etc. on a sheet of aluminium 10.

According to a second embodiment the mechanical stress is applied by press-forming of the metal object 10 with the metal foam 20.

The metal object 1 is therefore, here too, a foil or sheet metal, to which a non-developable form according to conventional press-forming techniques is applied.

For this, the metal object 10 surmounted by the metal foam 20 is placed in a stamping press, then mechanical stress is applied to the object 10 and to the foam 20 by stamping it. This results in a metal assembly 1 having a non-developable form covered by a metal layer 20 coming from the foam embedded in the metal object 10.

Other techniques such as embossing, forging, stamping, etc. are also used for the step for application of the mechanical stress.

According to a third embodiment, the mechanical stress is applied by crimping of the metal foam 20 onto the metal object 10.

This embodiment is particularly adapted especially when the object 10 has one very large dimension (length) before the two other dimensions (width and height), such as for example a wire, a cable, etc. and the foam 20 is applied locally to the object 10.

For this, a crimping tool especially can be used, such as pliers or a crimping press, which can be manual, electrohydraulic, etc. and embeds the metal foam 20 over all or part of the metal object 10.

The crimping is preferably done locally, for example at the level of one end only of the object 10, or over its entire length.

The process consists of placing the metal foam 20 on the part of the object 10 to be printed, then, with use of the crimping tool by applying mechanical stress to the foam 20 so as to embed it in the surface of the object 10.

As a variant, crimping is done at one of the ends of the object 10 by means of a metal trim, typically a pod.

In this case, the metal foam 20 can be placed on the end to be crimped. A pod is then placed on the metal foam 20 before it is crimped onto the object 10.

It is also possible to use a pod provided directly, on its inner face, with the metal foam 20. Then the pod fitted with the metal foam 20 is placed onto the end of the object 10 to be crimped, then mechanical stress is applied to the pod so as to embed the foam 20 in the surface of the end of the object 10.

The resulting metal assembly 1 is an aluminium wire or cable, covered at least at one end by a metal layer 20 which can be copper, nickel, iron, etc.

By way of variant, mechanical stress is applied by rolling in a segment over the entire length of the metal object 10, which may be a wire or a cable, so as to embed the metal foam 20 over its entire surface.

Such wires/cables 1 can be used advantageously in low-voltage electric distribution in the areas of the building and residential, or in aeronautics and for automobiles. These novel electric wires/cables 1 are actually lighter than conventional electric copper wires, with better electric and thermal conductibility than conventional aluminium wires. In addition, the presence of the layer of copper 20, at least at the ends of the wire 1, makes its connections much easier since it becomes weldable and conductive, such that it can now be used with conventional connections. Finally, printing copper on the aluminium reduces problems associated with oxidation of aluminium and especially resistance of conducting electric power in connections.

The resulting electric wires or cables 1 are therefore conductors having excellent conductivity, robust and durable and capable of resisting mechanical stresses to which they can be subjected during their installation, while being light and low-cost.

Optionally, the process further comprises an additional step consisting of densifying the metal layer of the resulting metal assembly 1.

This densification step can be conducted by repeating the process according to the invention. An additional metal foam 10' is applied. This additional foam 10' can be identical to the metal foam 20 used previously for making the assembly 1, or be a different metal and/or have different dimensions (porosity, thickness of the foam, etc.).

After reiteration of the process with this additional metal foam 10', the metal layer of the assembly 1 is more compact and better covers the metal object 10.

It is understood that an aluminium object printed several times according to the process of the invention with several layers of metal foam will be better insulated and plus easily weldable than the same object having one printed metal layer only, since stacking metal foams reduces the aluminium surface not covered due to the presence of pores.

According to a variant embodiment, the metal layer can also be densified by chemical or electrolytic deposit of an additional metal layer 10'.

This is the case especially of the layer of copper printed on the sheet of aluminium of the preceding example, which can easily be densified by chemical or electrolytic deposit of the additional layer 10' according to conventional techniques. The layer of copper actually constitutes a barrier for the layer of alumina on the surface of the sheet of aluminium and therefore enables such deposits.

Optionally, when the metal object 10 is aluminium, the process can also comprise an additional step of thermal treatment of the object 10 prior to its assembly step 100 with the metal foam.

According to a first step, allotropic transformation of the layer of oxide present on the surface of the aluminium sheet is conducted.

For this, the aluminium object 10 is brought to a temperature between around 80% and 100% of the fusion temperature of its constitutive material for a sufficiently long period to stabilise said layer.

The aluminium object 10 is preferably heated at a temperature between 93% and 98% of the fusion temperature, then more preferably at a temperature of the order of 95% (+/− 1%).

For example, the aluminium object 10 can be aluminium food foil having a thickness between 5 and 20 microns heated between 500° C. and 660° C., or a sheet of aluminium of 2 mm in thickness made of an alloy of AU4G heated between 500° C. and 550° C.

For these two examples of an aluminium object 10, the duration of thermal treatment is between twenty minutes and around two hours, preferably thirty minutes.

In the case of the object 10 such as thicker aluminium metal sheets, typically 12 mm, the duration of thermal treatment is preferably of the order of 45 minutes.

In a second step, the aluminium object 10 is cooled.

Both the time necessary for cooling the aluminium object 10 and the dwell time at the stabilising temperature of the layer of alumina which must be considered as essential must be distinguished here. The cooling and the final temperature time after cooling are not actually determining characteristics per se, since the temperature of the aluminium object 10 is sufficiently lowered to allow its subsequent treatment by the process of the invention, that is, here its assembly with the metal foam and its mechanical stress.

It is in fact possible to cool the aluminium object 10 slowly in air or rapidly (for example by soaking) without this influencing the result obtained.

The final cooling temperature can for example be the temperature of the piece in which the process is carried out, typically twenty degrees. It is however possible to cool the aluminium object 10 more (for example down to zero degrees Celsius), or at least cool it (for example to sixty degrees Celsius).

The result is an aluminium object 10 having breaking resistance less than prior to thermal treatment (between 15 and 20 MPa for an aluminium sheet of 2 mm, instead of sixty prior to thermal treatment). Thermal treatment actually increases the size of the grain of the aluminium, making it easier to work with later.

The invention claimed is:

1. A process for manufacturing an aluminium-metal metal assembly,
    comprising a metal layer made of a first metal on the surface of a metal object made of aluminum, the metal object being elongated, wherein said process comprises the following steps:
    placing a metal foam having an open porosity on a surface of the metal object, a diameter of the pores being less than 1 millimeter to allow embedding of the foam in the object, and
    crimping the metal foam onto the metal object so as to embed it in the surface of the metal object,
    the process further comprising a densification step of the metal layer during which an additional metal layer made of a third material is applied to the metal layer of the assembly.

2. The process as claimed in claim 1, in which the first metal is selected from the following group: copper, nickel, iron, and aluminium.

3. The process as claimed in claim 1, in which the object is a wire, a cable, or a bar.

4. The process as claimed in claim 1, in which the crimping is completed by means of a pod whereof an internal surface is covered by the metal foam.

5. The process as claimed in claim 1, in which the metal foam is embedded over the entire surface of the metal object.

6. The process as claimed in claim 1, in which the additional metal layer is applied by chemical or electrolytic deposit.

7. The process as claimed in claim 1, in which the additional metal layer is an additional metal foam which is embedded in the surface of the metal layer of the metal assembly by reiterating the steps of placement and application of stress.

8. The process as claimed in claim 1, further comprising the following steps prior to the placement step of the foam on the object:
    thermally processing the aluminium object by bringing it to a temperature between 80% and 100% of the fusion temperature of the material constituting it to create and stabilise a layer of alumina alpha by allotropic transformation of the layer of oxide present on the surface of said aluminium object, and
    cooling the aluminium object.

9. A metal assembly obtained by the manufacturing process as claimed in claim 1, wherein said metal assembly comprises a metal layer embedded in a metal object surface following the application step of crimping.

10. The metal assembly as claimed in claim 9, further comprising an additional metal layer made of a third metal.

11. The metal assembly as claimed in claim 10, in which the additional metal layer is embedded in the metal layer made of the first metal.

12. The metal assembly as claimed in claim 9, in which the metal object is a wire or an aluminium cable and the metal layer is copper.

13. A process for manufacturing an aluminium-metal metal assembly, comprising a metal layer made of a first metal on the surface of a metal object made of a second metal, the first or the second metal being aluminium, wherein said process comprises the following steps:
    placing a metal foam having an open porosity on a surface of the metal object,
    applying mechanical stress on the metal foam so as to embed it in the surface of the object, and
    densificating the metal layer by applying an additional metal layer made of a third material to the metal foam of the assembly.

14. The process as claimed in claim 13, in which the additional metal layer is applied by chemical or electrolytic deposit.

15. The process as claimed in claim 13, in which the additional metal layer is an additional metal foam which is embedded in the surface of the metal layer of the metal assembly by reiterating the steps of placement and application of stress.

16. A metal assembly obtained by the manufacturing process as claimed in claim 15, wherein said metal assembly comprises a metal layer embedded in a metal object surface following the application step of mechanical stress and an additional metal layer made of a third metal.

17. The metal assembly of claim 16, wherein the additional metal layer is embedded in the metal layer made of the first material.

18. The metal assembly as claimed of claim 16, in which the first and the second metal are selected respectively from the following couples of metals:
    copper, aluminium,
    aluminium, copper,
    nickel, aluminium,
    aluminium, nickel,
    iron, aluminium, and
    aluminium, aluminium.

* * * * *